United States Patent [19]

Fenton

[11] Patent Number: 4,508,557
[45] Date of Patent: Apr. 2, 1985

[54] DEAD PLATE ARRANGEMENT OF A GLASSWARE FORMING MACHINE

[75] Inventor: Frank A. Fenton, Wheatley, England

[73] Assignee: Emhart Industries, Inc., Farmington, Conn.

[21] Appl. No.: 510,865

[22] Filed: Jul. 5, 1983

[30] Foreign Application Priority Data

Jul. 9, 1982 [GB] United Kingdom ............... 8219987

[51] Int. Cl.³ ............................................ C03B 35/12
[52] U.S. Cl. ...................................... 65/348; 65/262; 65/351
[58] Field of Search ................ 65/348, 351, 181, 262, 65/260

[56] References Cited

U.S. PATENT DOCUMENTS

| | | | |
|---|---|---|---|
| 2,182,167 | 12/1939 | Berthold | 65/348 |
| 2,888,131 | 5/1959 | Allen | 65/260 X |
| 3,186,822 | 6/1965 | Rieck | 65/181 X |
| 3,449,104 | 6/1969 | Hamilton | 65/181 |
| 3,764,284 | 10/1973 | Rowe | 65/260 X |

*Primary Examiner*—Arthur Kellogg
*Attorney, Agent, or Firm*—Arthur B. Moore

[57] ABSTRACT

The arrangement comprises a perforated dead plate above which a newly-moulded glassware article can be supported for cooling. Cooling means sucks air downwards through the dead plate so that the air flows past the article cooling it. The cooling means may comprise an air mover whose input end abuts the underside of the dead plate. A shroud may be provided which surrounds the article to force the air to flow downwards past the article.

11 Claims, 2 Drawing Figures

Fig_1

DEAD PLATE ARRANGEMENT OF A GLASSWARE FORMING MACHINE

BACKGROUND OF THE INVENTION

This invention is concerned with a dead plate arrangement of a glassware forming machine comprising a perforated dead plate above which a newly-moulded glassware article can be supported to be cooled and on which the article can be placed for subsequent removal from the machine, and cooling means operable to cause air to flow past the article to cool it while the article is supported above the dead plate.

Known machines which manufacture articles of glassware have a mechanism which grips newly-moulded articles of glassware and lifts them away from the moulds in which they have been formed. This mechanism which is called a take-out mechanism moves the articles to a position a short distance above a so-called dead plate of the machine. The articles cannot at this stage be placed on the dead plate because they are as yet too hot and require to cool before they can be released on to the dead plate. In order to accelerate the cooling of the articles, the dead plate is perforated and cooling air is blown upwardly through the dead plate on to the articles so that the air flows past the articles cooling them. Once the articles are sufficiently cool, they are released on to the dead plate allowing the take-out mechanism to return to fetch further articles. The articles are subsequently removed from the dead plate by a "wipe-out" mechanism which pushes them off the dead plate and on to a conveyor. Once on the conveyor, the articles are, in many cases, coated with a fluid which lubricates their movements in further operations and protects them from damage. This coating is applied by spraying the articles as they are moved by the conveyor.

In the known machines mentioned above, the air blown through the dead plate generates considerable noise and this combined with the heat absorbed by the air makes the region of the dead plate an unpleasant working environment. Further more, the operation of cooling means has to be stopped or greatly reduced when the articles are released on to the dead plate lest they be blown off the dead plate.

It is an object of the present invention to provide a dead plate arrangement in which the noise and heat in the region of the dead plate are reduced and the cooling means can continue to operate after the article has been placed on the dead plate without risk of displacing the article.

BRIEF SUMMARY OF THE INVENTION

The object is achieved according to the invention in that the cooling means is operable to suck air downwards past the article and through the dead plate. This arrangement is found to be less noisy, removes hot air from the region of the dead plate, and instead of tending to remove the article from the dead plate pulls the article on to the dead plate.

In order to reduce still further the noise generated by the cooling means, the cooling means comprises an air mover whose input end abuts the underside of the dead plate. An air mover is an aerodynamic device which uses small quantities of compressed air to entrain large quantities of low pressure air from the atmosphere. An example of an air mover is shown in the accompanying drawings and described in detail in relation to the drawings. This arrangement is found to be quiet and in addition does not require the provision of a fan which can itself be a source of undesirable noise. Furthermore, the flow of cooling air can readily be adjusted by adjusting the supply of compressed air to the air mover.

In order to improve the cooling effect achieved by the cooling means, the dead plate arrangement also comprises a shroud which is impervious to air and which, when the article is supported above the dead plate, extends upwardly from the dead plate and substantially surrounds the article. This shroud causes the sucked air to move downwards along the surface of the article and thereby increases the cooling effect. Furthermore, the shroud reduces to some extent, the radiant heat from the article which can fall on an operator.

Where the arrangement has a shroud as described above, in order to enable articles to be easily positioned above and placed on the dead plate and also to enable articles to be easily removed from the dead plate, the shroud is movable between an out-of-the-way position in which the shroud does not project above the dead plate and an operative position in which it substantially surrounds an article as aforesaid, and the arrangement comprises moving means operable to move the shroud into its operative position once an article is in position supported above the dead plate.

So that the upper surface of the shroud can assist in supporting an article as it is pushed off the dead plate and on to a conveyor, when the shroud is in its out-of-the-way position, the upper surface of the shroud is flush with the upper surface of the dead plate. Furthermore, to accommodate differing heights of article, the operative position of the shroud is vertically adjustable.

As mentioned above, in known machines articles are coated with a lubricating fluid, after being removed from the dead plate, by being sprayed while on a conveyor. This arrangement has the disadvantages that the fluid has not been applied to the article at the stage when the wipeout mechanism operates upon it and, furthermore, fluid enters the atmosphere and may require extraction in case it becomes a hazard. These disadvantages are overcome, where the arrangement has a shroud as described above, in that the shroud supports article coating means operable to spray a coating fluid on to an article. Thus, the coating fluid is applied to the article before it is engaged by the wipe-out mechanism and any fluid which does not adhere to the article is sucked through the dead plate by the cooling air. Furthermore, it is possible to recover the fluid sucked through the dead plate for re-use. Where the shroud is movable as aforesaid, the coating means may be operable to spray the article as the shroud moves from its operative position to its out-of-the-way position, thus coating the article over a substantial proportion of its height.

In order to provide additional cooling of the bottom of an article and to prevent the bottom of the article from sagging, the dead plate arrangement comprises blowing means operable to blow air upwardly through the dead plate on to a central region of the bottom of an article supported above the dead plate.

BRIEF DESCRIPTION OF THE DRAWINGS

An illustrative dead plate arrangement is shown in the drawings. In which.

DETAILED DESCRIPTION

Figure 1:
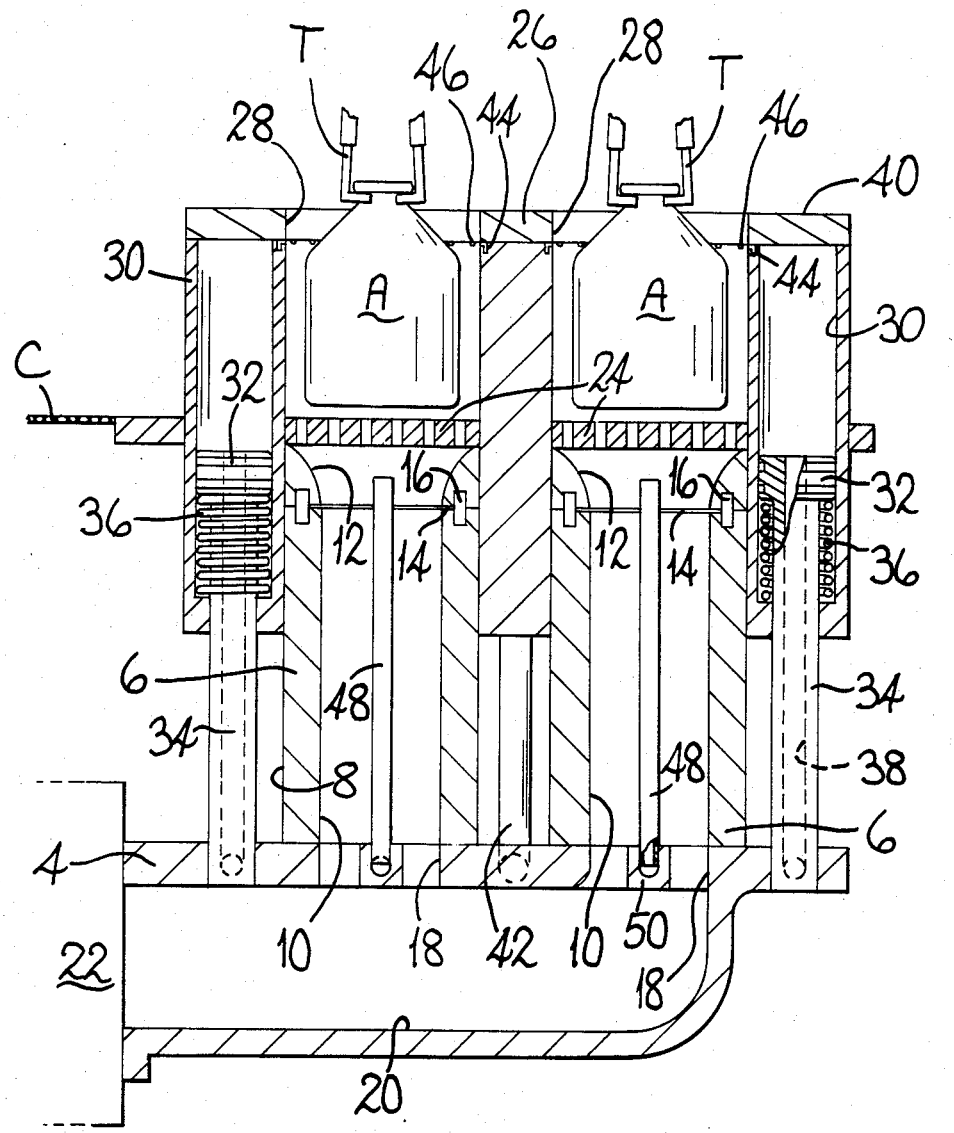
FIG. 1 is a cross-sectional view taken longitudinally through the illustrative dead plate arrangement showing a shroud thereof in an operative position, thereof.

The illustrative dead plate arrangement comprises a horizontal base plate 4 on which other parts of the arrangement are supported. Two air movers 6 of the arrangement are mounted on top of the base plate 4 with their longitudinal axes extending vertically. Each of the two air movers 6 has a cylindrical outer surface 8 and a passage 10 passes vertically upwards through each air mover 6. Each passage 10 has a cylindrical portion which extends away from the base plate 4 and an upper portion 12 which increases in width away from the cylindrical portion having a wall that is convex when viewed in longitudinal cross-section (see drawings). At the junction between the upper portion 12 and the cylindrical portion of the passage 10, an annular slit 14 is formed in the wall of the passage 10. The annular slit 14 communicates with an annular chamber 16 in the air mover 6. The lower end of each passage 10 communicates through a hole 18 in the base plate 4 with a duct 20 which leads to an expansion chamber 22 of the arrangement.

When air under pressure is supplied to the annular chamber 16 of one of the air movers 6, the air passes through the slit 14 into the passage 10 and, by the well-known principle of the air mover, causes air to flow downwardly in the passage 10. Small quantities of compressed air supplied to the chamber 16 entrain large quantities of air from the atmosphere so that air is sucked into the upper end of the passage 10 and ejected through the lower end of the passage 10 into the duct 20.

Supported on top of each air mover 6 and extending across the upper end of the passage 10 is a circular horizontal perforated dead plate 24 so that the upper or input end of the passage 10 abuts the underside of the dead plate 24. Newly-moulded glassware articles A can be supported by tongs T of a take-out mechanism of a glassware forming machine (see FIG. 1). Above each dead plate 24 to be cooled by air sucked through the dead plate 24 by the action of the air mover 6. The articles A can also be placed on the dead plate 24 (see FIG. 2) for subsequent removal from a glassware forming machine of which the illustrative dead plate arrangement forms part. The air mover 6 thus forms cooling means to cause air to flow past the article A to cool it while it is supported above the dead plate 24, the air mover 6 being operable to suck air downwards past the article A and through the dead plate 24.

A shroud 26 of the illustrative arrangement is arranged to extend upwardly from the dead plates 24 and substantially surround the articles A when they are supported above the dead plates 24. The shroud 26 is in the form of a block having two vertically-extending circular passages 28 therethrough into which the articles A are received for cooling. The shroud 26 is constructed of material which is impervious to air and has the function of causing air to flow vertically past the articles A as it is sucked through the dead plates 24 so that the cooling effect is increased.

The shroud 26 incorporates the cylinders 30 of two piston and cylinder assemblies. The assemblies have fixed pistons 32 from which vertically extending piston rods 34 extend downwards and are fixed to the base plate 4. Beneath each piston 32, a spring 36 is contained in the cylinder 30 and acts to urge the cylinder 30 and hence the shroud 26 downwards. An air passage 38 passes upwardly through the piston rod 34 and the piston 32 so that air under pressure can be supplied to the cylinder 30 above the piston 32 to move the cylinder and hence the shroud 26 upwards. The air movers 6 and dead plate 24 are received in the passages 28 of the shroud 26 and serve to guide the shroud 26 in vertical movement caused by the piston and cylinder assemblies 30, 32. The shroud 26 is movable between an out-of-the-way position thereof (shown in FIG. 2) in which the shroud 26 does not project above the dead plate 24, and hence does not obstruct arrival or removal of the articles A, and an operative position thereof (shown in FIG. 1) in which the shroud 26 substantially surrounds the articles A as aforesaid. The piston and cylinder assemblies 30, 32 and the springs 36 form moving means of the arrangement operable to move the shroud 26 into its operative position once articles A are in position supported above the dead plates 24 and to move the shroud 26 into its inoperative position when the articles A are to be removed. When the shroud 26 is in its out-of-the-way position, an upper surface 40 thereof is flush with the upper surfaces of the dead plates 24 so that the surface 40 can assist in supporting articles A as they are pushed off the dead plates 24 by a wipe-out mechanism (not shown) and on to a conveyor C for removal from the machine. If articles of differing heights are to be accommodated, the operative position of the shroud can be adjusted by means of an adjustable stop (not shown) arranged to contact a projection of the shroud 26 (also not shown).

The shroud 26 supports article coating means operable to spray a coating fluid on to the articles A. The coating means comprises a pipe 42 which is connected via a valve (not shown) to a source of pressurised coating fluid (also not shown). The pipe 42 is fixed to the base plate 4 and extends vertically upwardly therefrom. The pipe 42 is received into a bore (not shown) in the shroud 26 with which the pipe 42 makes a sliding seal. The bore in which the pipe 42 is received is connected to two annular chambers 44 one of which extends around an upper portion of each of the passages 28 in the shroud 26. Each chamber 44 is connected to the interior of the passage 28 by a series of passages 46 distributed around the passage 28. When fluid under pressure is pumped up the pipe 42, the fluid sprays out through the passages 46 on to an article A in the passage 28. If desired, the fluid can be sprayed while the shroud 26 is moved from its operative position so that the passages 46 move downwardly past the article A while spraying takes place.

The illustrative arrangement also comprises blowing means operable to blow air upwardly through the dead plates 24 on to a central region of the bottom of articles A supported above the dead plates 24. The blowing means comprises two tubes 48 each of which extends upwardly from a projection 50 of the base plate 4 into the hole 18. Each tube 48 extends upwardly and centrally through the passage 10 of an air mover 6 and has its upper end adjacent the underside of the dead plate 24. Air is blown upwardly through the tubes 48 through the dead plates 24 on to the bottoms of the articles A to cool the bottoms and prevent sagging thereof.

Figure 2:
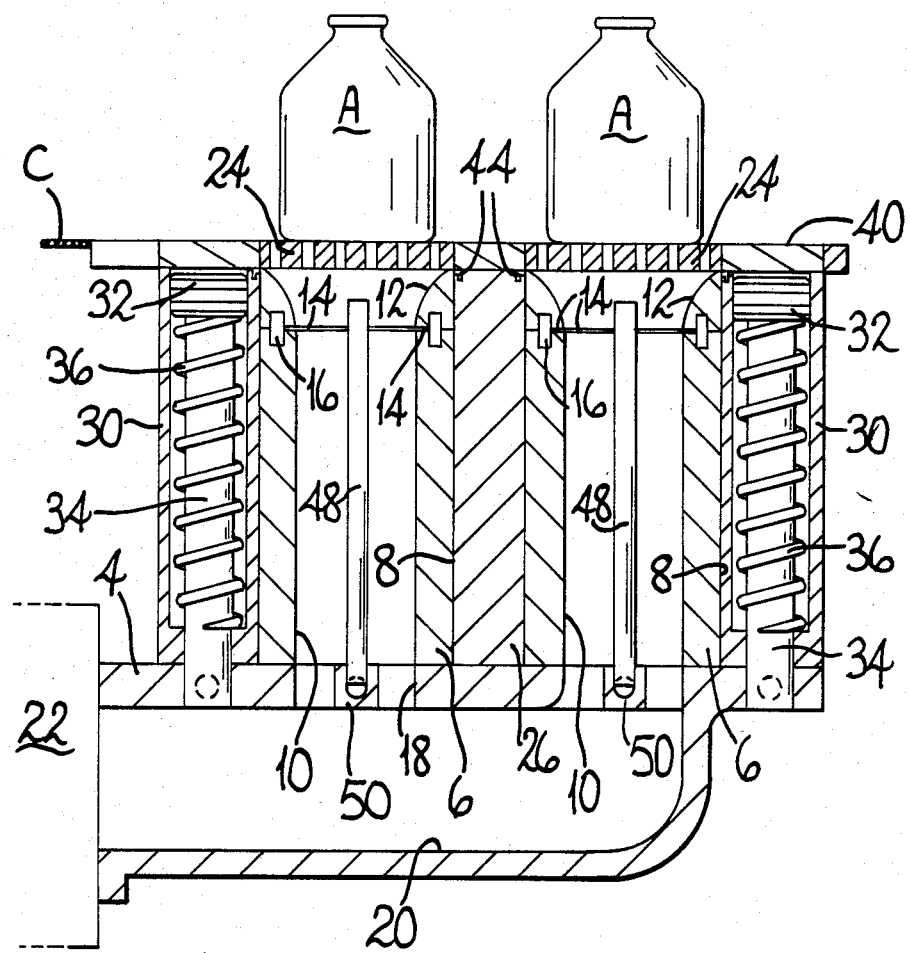
FIG. 2 is a similar view to FIG. 1 but showing the shroud in an out-of-the-way position thereof.

In the operation of the illustrative dead plate arrangement, articles A to be cooled are positioned above the dead plates 24 while the shroud 26 is in its out-of-theway position. The air movers 6 now operate to suck air through the dead plates 24 and the piston and cylinder assemblies 30, 32 are operated to move the shroud 26 to its operative position (this condition is shown in FIG. 1). As the shroud 26 moves to its operative position, the coating means sprays the articles with coating fluid. The coating may continue after the shroud 26 reaches its operative position. Meanwhile the blowing means operates to cool the bottoms of the articles A. After a predetermined time, the tongs T release the articles A on to the dead plates 24 and the springs 36 are allowed to return the shroud 26 to its out-of-the-way position. Once the shroud 26 has reached its out-of-the-way position (as shown in FIG. 2) the articles A can be removed from the dead plates 24 by being pushed sideways on to a conveyor C.

The illustrative dead plate arrangement generates less noise than conventional arrangements and reduces the heat released to the atmosphere in the region of the dead plate. Its cooling means can operate continuously since there is no likelihood of blowing articles off the dead plates 24.

I claim:

1. A dead-plate arrangement for receiving a newly-molded glassware article in a glassware forming machine, cooling the article, and transferring the article to an exit assembly, comprising:
   a dead-plate having a plurality of apertures;
   a cooling assembly for drawing air downwardly through the apertures of said dead-plate;
   an air-impervious shroud mounted relative to said dead-plate to move between operative and out-of-the-way positions, wherein in its operative position said shroud substantially surrounds the entire sidewall of the article while the latter is supported over the dead-plate, whereby air flows downwardly past the article's exterior walls through the dead-plate apertures; and
   means for subsequently transferring the article to an exit assembly while the shroud is in its out-of-the-way position.

2. A dead plate arrangement according to claim 1, wherein the cooling means comprises an air mover whose input end abuts the underside of the dead plate.

3. A dead-plate arrangement according to claim 1, wherein the shroud when its out-of-the-way position does not project above the dead-plate, and is moved to its operative position once an article is in position supported above the dead-plate.

4. A dead plate arrangement according to claim 3, wherein, when the shroud is in its out-of-the-way position, an upper surface of the shroud is flush with the upper surface of the dead plate.

5. A dead-plate arrangement according to claim 4, wherein the article does not contact the dead-plate while supported above the dead-plate for cooling, and the transferring means comprises:
   means for releasing the article to rest upon the dead-plate, and for sliding the article across the dead-plate and the upper surface of the shroud to said exit assembly.

6. A dead plate arrangement according to claim 3, wherein the operative position of the shroud is vertically adjustable.

7. A dead plate arrangement according to claim 3, wherein the shroud supports article coating means operable to spray a coating fluid on to an article.

8. A dead plate arrangement according to claim 7, wherein the coating means is operable to spray the article as the shroud moves from its out-of-the-way position to its operative position.

9. A dead plate arrangement according to claim 1, wherein the shroud supports article coating means operable to spray a coating fluid on to an article.

10. A dead plate arrangement according to claim 1, wherein the arrangement comprises blowing means operable to blow air upwardly through the dead plate on to a central region of the bottom of an article supported above the dead plate.

11. A dead plate arrangement according to claim 10, wherein the cooling means comprises an air mover whose input end abuts the underside of the dead plate and the blowing means comprises a tube extending upwardly and centrally through the air mover.

* * * * *